United States Patent [19]
Sartorio et al.

[11] Patent Number: 5,148,693
[45] Date of Patent: Sep. 22, 1992

[54] METHOD AND A DEVICE FOR DETECTING FOLDING ANGLES OF A METAL SHEET DURING THE FOLDING AND A METHOD FOR FOLDING OF A METAL SHEET

[75] Inventors: Franco Sartorio; Bruno Nicoletta, both of Turin, Italy

[73] Assignee: Amada Company, Limited, Japan

[21] Appl. No.: 783,918

[22] Filed: Oct. 29, 1991

Related U.S. Application Data

[62] Division of Ser. No. 612,574, Nov. 14, 1990, Pat. No. 5,099,666.

[30] Foreign Application Priority Data

Nov. 14, 1989 [IT] Italy .................. 67996 A/89
Nov. 14, 1989 [IT] Italy .................. 67997 A/89

[51] Int. Cl.$^5$ .................................. B21D 5/02
[52] U.S. Cl. .......................... 72/12; 72/30; 72/389; 72/702
[58] Field of Search ............ 72/10, 11, 12, 30, 389, 72/702, 4, 33

[56] References Cited

U.S. PATENT DOCUMENTS

| | | | |
|---|---|---|---|
| 3,765,204 | 10/1973 | Wollner | 72/4 |
| 4,550,586 | 11/1985 | Aubert et al. | 72/389 |
| 4,564,765 | 1/1986 | Blaich | 72/389 |
| 4,864,509 | 9/1989 | Somerville et al. | 72/702 |
| 4,962,654 | 10/1990 | Zbornik | 72/10 |

FOREIGN PATENT DOCUMENTS

| | | | |
|---|---|---|---|
| 0166351 | 1/1986 | European Pat. Off. | |
| 0352097 | 7/1988 | European Pat. Off. | |
| 0049327 | 3/1988 | Japan . | |
| 0854749 | 8/1981 | U.S.S.R. | 72/4 |
| 0979006 | 12/1982 | U.S.S.R. | 72/4 |
| 2072551 | 3/1981 | United Kingdom . | |

Primary Examiner—David Jones
Attorney, Agent, or Firm—Wigman & Cohen

[57] ABSTRACT

A method for indirect detecting of folding angles ($\beta$) of a metal sheet (4) during the folding by a folding machine (1) which has a punch (2), and a die (3) provided with a depressed seat (5) is disclosed. The folding angle ($\beta$) is obtained by algebraic summing of an angle ($\alpha$) formed by adjacent two walls (10, 10, 13, 13, 13a, 13b) of the punch (2) or the seat (5) and each angle ($\alpha1$, $\alpha2$) between a portion (7, 8, 8a) of the metal sheet (4) and the said wall. The angles ($\alpha1$, $\alpha2$) formed between said portion (7, 8, 8a) and each wall (10, 13, 13a, 13b) are calculated by using the measurements of the distances (D1, D2, D3, D4) from the wall to the portion measured at desired two points on the wall. The distances are detected by a device such as differential transformers (18, 19, 20) and pneumatic gauges (50, 51, 52, 53, 54, 55) incorporated in the punch (2) or the die (3). The angle ($\beta$, $\beta1$, $\beta2$) once achieved is calculated during the folding operation after elastic restoring of the metal sheet has been caused. If the angle calculated is less than the desired, a supplementary folding is carried out to achieve a precise folding angle. The whole folding is carried out by a single folding operation without requiring a second positioning of the metal sheet.

2 Claims, 4 Drawing Sheets

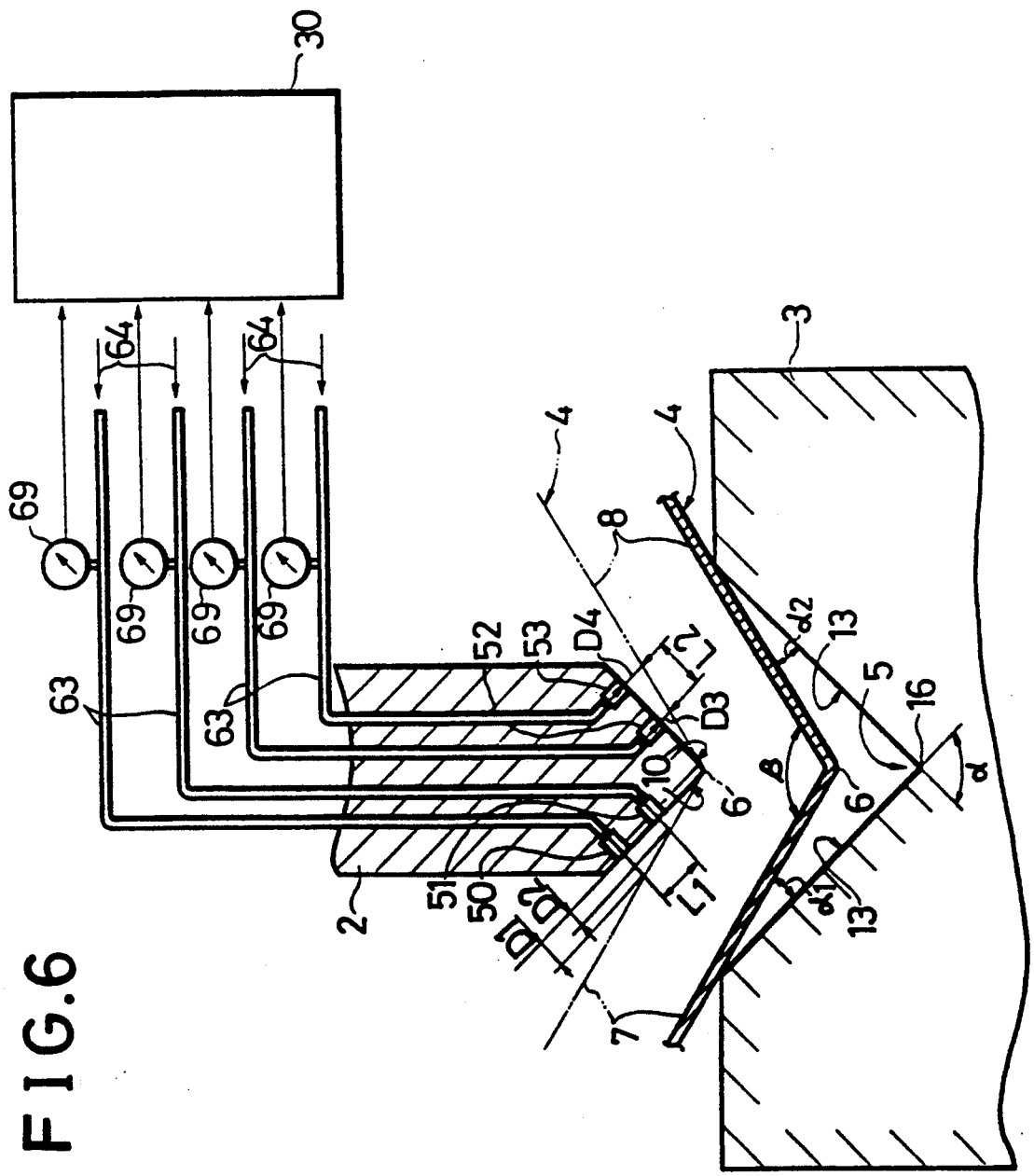

METHOD AND A DEVICE FOR DETECTING FOLDING ANGLES OF A METAL SHEET DURING THE FOLDING AND A METHOD FOR FOLDING OF A METAL SHEET

This is a divisional of co-pending application Ser. No. 07/612,574 filed on Nov. 14, 1990, now U.S. Pat. No. 5,099,666.

BACKGROUND OF THE INVENTION

1. Field of the Invention

The present invention relates to a method for detecting indirectly those angles through which a metal sheet has been folded into portions, during the operation of folding the metal sheet by a folding machine comprising a punch and a die which are movable relative to each other.

The invention also relates to a device for detecting the folding angles of a metal sheet which have been once folded, during the operating of folding the metal sheet.

The present invention further relates to a method for folding of a metal sheet using the above-mentioned method for detecting angles.

2. Description of the Prior Art

Folding operations have been now affected by inserting a metal sheet to be folded between a punch and a die. The die has a depressed seat, and the punch penetrates the depressed seat of the die by their relative movements in a certain distance under control of a central control unit of a folding machine. The controlling carried out on the basis of parameters such as the type and the thickness of the metal sheet, the desired folding angle, etc. establishes the amount of relative movement of the punch to the die, after having positioned the metal sheet in stationary contact with the die.

As a result, the punch penetrates the metal sheet against the depressed seat of the die in a predetermined distance; thus it folds the metal sheet into portions in the seat. The precision of the folding angles obviously depends on how deep the punch penetrates the depressed seat. The deeper the penetration of the punch is, the greater the precision is.

The described folding machine does not allow precise folding angles to be obtained by a single folding operation. In fact, during its plastic deformation, the metal sheet retains a residual elastic restoring which, when the punch is separated from the die, causes an elastic return of the metal sheet with a consequent reduction in the previously achieved folding angle of the metal sheet itself. Even though this phenomenon is known and is taken into account when determining the setting of the folding parameters by means of suitable corrective coefficients, it is nevertheless impossible theoretically to predict the actual amount of the phenomenon and, therefore, completely to correct it. Therefore, if precise folding angles are required it is necessary, after folding, to perform measurement of the angle obtained and, possibly, to perform a second and corrective folding operation. It is clear that this fact results in slowing down of and complicating the productive operations as well as greater production costs.

SUMMARY OF THE INVENTION

It is therefore an object of the present invention to provide a method for indirect measuring of folding angles through which a metal sheet has been folded, during the folding stage, that is, while it is still held between a punch and a die of a folding machine, in such a way as to be able to carry out immediately any possibly necessary corrections and, therefore, to obtain precise folding angles by a single operation.

It is also an object of the present invention to provide a device, which can be used even during a folding stage, for detecting or measuring indirectly of the folding angles of a metal sheet to have been once folded in the process of the folding.

It is also an object of the present invention to provide a method for folding of a metal sheet using the said method for detecting angles.

The said object is achieved by a method of the present invention for detecting indirectly each folding angle formed between each pair of adjacent two portions of a metal sheet into which the metal sheet has been folded, during an operation of folding by means of a folding machine comprising a punch and a die having a depressed seat adapted to cooperate with the said punch with the said metal sheet positioned between them.

The method for detecting indirectly each folding angle comprises following steps of:

measuring each distance at two points on each wall of either the depressed seat of the die or the punch from the wall surface to the said portion of the metal sheet which faces the wall;

calculating, on the basis of the said measurements, each angle formed between each said wall and said portion of the metal sheet which faces the wall; and summing algebraically the value of a constant and known angle between adjacent two walls of either the seat or the punch and the value of each said calculated value of each said angle between the said each wall and said portion of the metal sheet which faces the wall.

The measuring of each said distance at two points on each wall will be carried out by means of such as differential transformers and pneumatic gauges in the embodiments for this method.

The invention relates moreover to a device for detecting each angle formed between each pair of adjacent two portions of a metal sheet into which a metal sheet has been folded, during an operation forming the said fold by means of a folding machine comprising a punch and a die provided with a depressed seat adapted to cooperate with the said punch.

The device for detecting angles formed includes, in an embodiment, E-shaped differential transformers, each of which includes a pair of secondary windings and a primary winding disposed between the secondary windings and connected to electrical supply means, the said transformers each being mounted on a respective wall of either the seat of the die or the punch with the axis of the said windings being disposed substantially perpendicularly to the wall; and an algebraic summing device for receiving at its input the voltage values across the terminals of each secondary winding of the said differential transformers.

The device for detecting angles formed includes, in another embodiment, a plurality of pneumatic gauges mounted in pairs at two points on the each wall of either the seat of the die or the punch with the axis of each gauge disposed substantially perpendicularly to the wall; and an algebraic summing device for receiving at its inputs respective signals sent from the outputs of the said pneumatic gauges as a function of the resistance to the outflow encountered by respective fluid jets which the said pneumatic gauges are adapted to emit towards the said adjacent portions of the metal sheet.

A method of present invention for folding a metal sheet into portions to make an angle predetermined between each pair of adjacent two portions by using a folding machine comprising a punch and a die haivng a depressed seat adapted to cooperate with the said punch to form the said angle comprises the following steps of: forming the said fold by relatively moving the said punch and the said die, after inserting of the metal sheet between them, under control of a central control unit which is set in such a way as to cause the forming of an angle between the said adjacent two portions of the metal sheet of a value which is not less than the predetermined one while the metal sheet is clamped between the punch and the die; separating the punch and the die relatively by a distance enough to cause relaxation, and therefore, possible elastic restoring in the metal sheet; measuring of the angle formed between the said each pair of adjacent two portions of the metal sheet by using the above-mentioned device and the method; and executing of a supplementary folding operation if the values of the angles measured are different from the desired ones, after having made the measured angles available in the said central control unit, having made comparisons with desired values previously memorized in the central control unit, and having calculated a correction parameter.

BRIEF DESCRIPTION OF THE DRAWINGS

FIG. 6 shows a modified example of the angle detecting device which is incorporated in the punch of a folding machine.

DETAILED DESCRIPTION OF THE PREFERRED EMBODIMENTS

Figure 1:
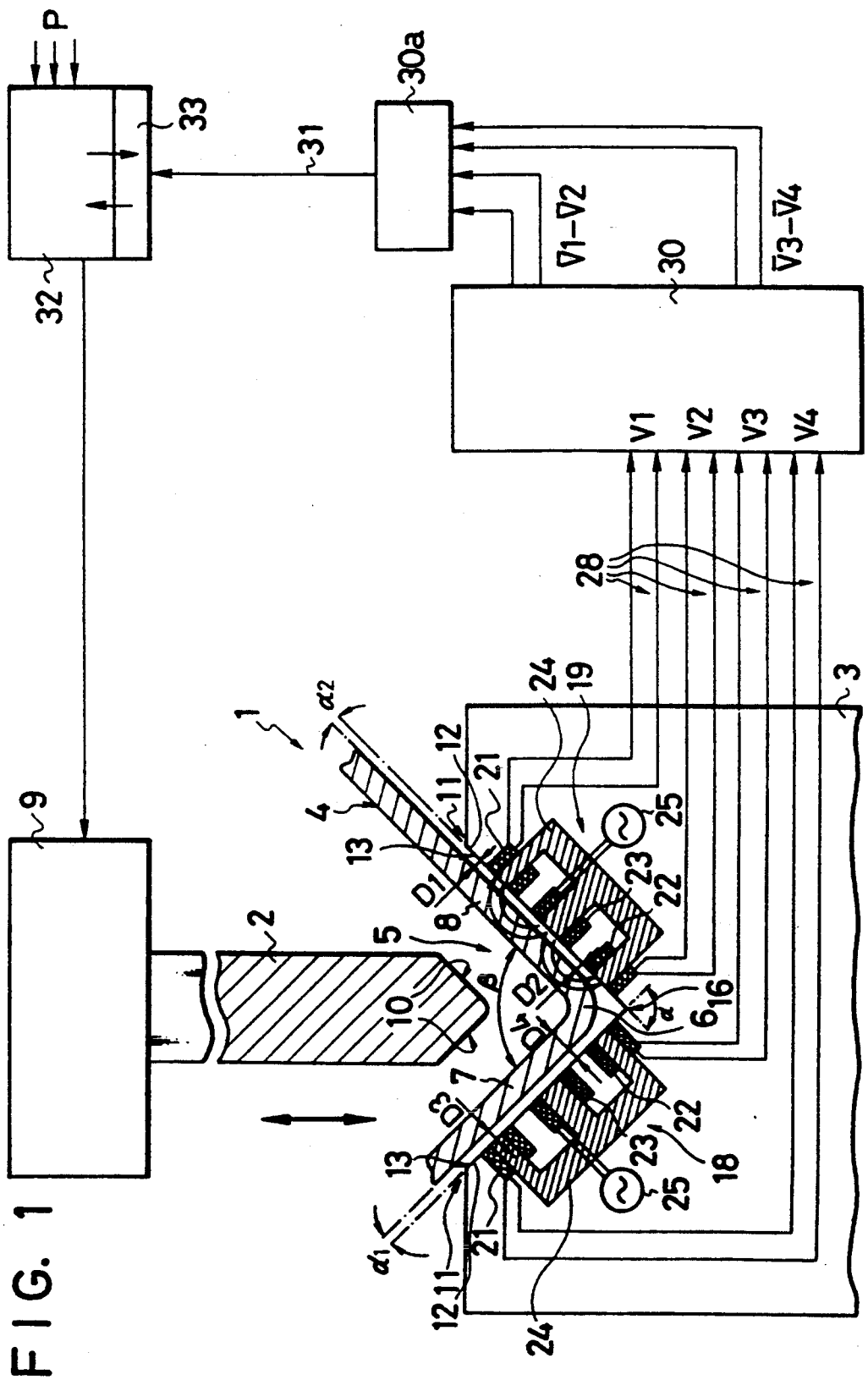
FIG. 1 is a schematic drawing of a folding machine provided with an angle detecting device of the present invention.

In FIG. 1 there is shown a folding machine 1 provided with a folding angle detecting device of the present invention. The folding machine 1 includes a punch 2 and a die 3 between which a metal sheet 4 to be folded can be inserted. The punch 2 and the die 3 are relatively movable in the direction of the arrows by means of a known actuating device 9. The punch 2 penetrates metal sheet 4 against the depressed seat 5 of the die 3 to fold it into two portions 7 and 8 making a fold 6 between them. The respective adjacent portions 7 and 8 of the metal sheet 4 on the opposite side of the fold 6 are held between inclined sides 10 of the punch 2 and the die 3 resting in contact with the die 3, in particular with respective opposite inclined edges 11 of the seat 5. The seat 5 is defined by respective opposite inclined flanks 12 delimited by respective wall surfaces 13, edges 11 and vertex 16 which is the bottom of the seat 5 itself.

According to the present invention, within the seat 5 there are disposed two E-shaped differential transformers 18 and 19, each of which includes a core 24 shaped like a capital E. The core 24 includes three transverse arms on which a pair of opposite secondary windings 21 and 22 and a central primary winding 23 disposed between the secondary windings 21 and 22 are mounted. The primary winding 23 is connected to alternating current electrical supply means 25. The transformers 18, 19 are mounted respectively on a lateral flank 12 of the seat 5, with the axes of the windings 21, 22, 23 being substantially perpendicular to the internal wall surface 13 of the associated flank 12. The design enables the primary windings 23 to produce magnetic flux which closes over the secondary windings 21, 22 of each transformer, as indicated by the circular arrows on the right, through the metal sheet 4 and, in particular, through the respective portions 7, 8 which, during the folding stage, are disposed adjacent to and facing the flanks 12.

The opposite terminal of the secondary windings 21, 22 are on the other hand connected through respective pairs of lines 28 to an algebraic summing device 30 of known type, adapted to receive at its inputs the voltage values V1 and V2 across the terminals of the windings 21 and 22 respectively of the transformer 19 and the voltage values V3, V4 across the terminals of the winding 21, 22 respectively of the transformer 18. The algebraic summing device 30 is connected to an A/D converter 30a which has an output line 31 connected to an electronic central control unit 32 of known type, for example a microprocessor, for controlling the folding machine 1. The central control unit 32 controls the actuating means 9 to determine the relative motion of the punch 2 and the die 3. In particular, the line 31 is connected to a section 33 of the central control unit 32. This section 33, on the basis of the signal sent through the line 31 by the summing device 30, calculates correction coefficients. The coefficients are then supplied to the central control unit 32, to which, for example through suitable control software, also supplied are respective external working parameters P (for example, thickness and material of the metal sheet 4, a value of the folding angle to be achieved, etc.).

In use, the metal sheet 4 is folded after it has been inserted between the punch 2 and the die 3. The depressed seat 5 of the die 3 has an angle $\alpha$ of fixed and known value at the vertex 16, of fixed and know value. The value of the angle is memorized in the central control unit 32. Then, the punch 2 and the die 3 are caused to approach each other following the actuation of the means 9 by the central control unit 32 according to the program memorized in it, which processes the parameters P later. At the same time, each supply device 25 applies an alternating voltage across the terminals of the primary windings 23 of each of the transformer 18 and 19. When the punch 2 comes into contact with the metal sheet 4 it deforms the sheet by pressing it against the seat 5 and forms the fold 6. During this folding stage, the central control unit 32 is programmed in such a way as to stop the penetration of the punch 2 into the seat 5 at a point such as to cause the forming of an angle $\beta$ between the portions 7 and 8 of the metal sheet 4, the value of which is in each case not less than the desired value.

It is understood that starting with an unfolded metal sheet 4 having an angle $\beta$ equal to 180° (flat metal sheet), this angle is gradually reduced as the punch 2 penetrates the metal sheet 4 against the seat 5, progressively deepening the fold 6. It is also understood that in the fold 6 in part remains elastic deformation which reduces the depth of the fold 6, or increases the angle β previously achieved when the metal sheet 4 is released.

After the penetrating, the central control unit 32 controls a relative separating of the punch 2 from the die 3 by an amount to permit the elastic return of the metal sheet 4, which cancels the elastic deformation remaining in the metal sheet 4. After the elastic return, the metal sheet 4 gets slight increase in the value of the angle β, and engages with flanks 12, in particular, with edges 11 of the flanks 12. According to the present invention, as soon as the central control unit 32 separates the die 3 from the punch 2 by an amount sufficient to obtain said complete elastic return of the metal sheet 4, it proceeds to measure the increased angle β.

According to the present invention, this measuring is affected indirectly by measuring the distance between each portion 7 (or 8) of the metal sheet 4 and the associated flank 12 of the seat 5 at two predetermined points distant from each other on the wall surface 13 of the flank 12. In particular, it is preferable to select the first point to be near the vertex 16 and at an arm of the core 24 on which the winding 22 of each transformer 18 (or 19) is mounted. And, the second one is to be near the lateral edge 11 and at an arm of the core 24 on which the winding 21 of each transformer 18 (or 19) is mounted. The distances indicated respectively by D1, D2, D3 and D4 are detected as respective voltages V1, V2, V3 and V4 across the terminals of the secondary windings 21 and 22 of the two transformers 18, 19. In fact, the primary windings 23, under the effect of the AC sources 25, generate a magnetic field, the lines of force of which close across the portions 7, 8 of the metal sheet 4 inducing a linked magnetic field in the secondary windings 21, 22 which, in turn, produce the potential differences V1, V2, V3 and V4 across the terminals of the secondaries. These voltages are a function of the distances D1, D2, D3 and D4. As the number of turns of each windings 21 (or 22) is fixed and constant, they are a function solely of the magnetic flux linkage with the windings themselves, which, in turn, is solely a function of the reluctance of the magnetic circuit defined by each primary winding, the associated secondary windings, the respective portions 7, 8 of the metal sheet and the associated air gap between these and the secondary windings, defined by the distances D1, D2, D3 and D4. The greater these distances are, the greater the magnetic flux dispersion and the reluctance of the overall magnetic circuit are, and consequently, the smaller the magnetic flux linked with the respective secondaries, with consequent generation of a correspondingly smaller voltage V1, V2, V3, V4 on these. On the other hand, the smaller these distances are, the greater the values of the voltages induced in the secondaries are. The values of the voltages become maximum when the distances D are zero.

As soon as the metal sheet 4 becomes free from the punch 2, the summing device 30 reads the voltages V1, V2, V3, V4 and utilizes them to calculate the angle α1 and α2 formed between each portion 7, 8 of the metal sheet and the corresponding flank 12. This calculation is carried out on the basis that, within the range of linearity of the transformers utilized, each angle is inversely proportional to the difference between the effective values of the voltages V1 and V2 (and V3 and V4 respectively) independently of the distance of the portion 7 (or 8) of the metal sheet from the respective flank 12 of the die. The voltage signals proportional to the signals α1 and α2 are converted into digital form by the A/D converter 30a. Then, the central control unit 32 in which the geometric parameters and constants of proportionality of the system constituted by the die 3, transformers 18, 19, metal sheet 4 assembly are memorized, operates to calculate the values of α1 and α2, and algebraically to sum the value of the known and previously memorized angle α, and the values of the angles α1 and α2. Finally, the unit 32 provides at its output the exact value of the folding angle β achieved. At this point, the central control unit 32 processes and compares the value of the angle β with the desired value provided as one of the parameters P. If this comparison gives a negative result, the central control unit 32 processes a correction parameter in the section 33 and controls the execution of a supplementary folding operation to deepen the fold 6 by an amount depending on the processed correction parameter to obtain the desired value of the angle β.

Figure 4:
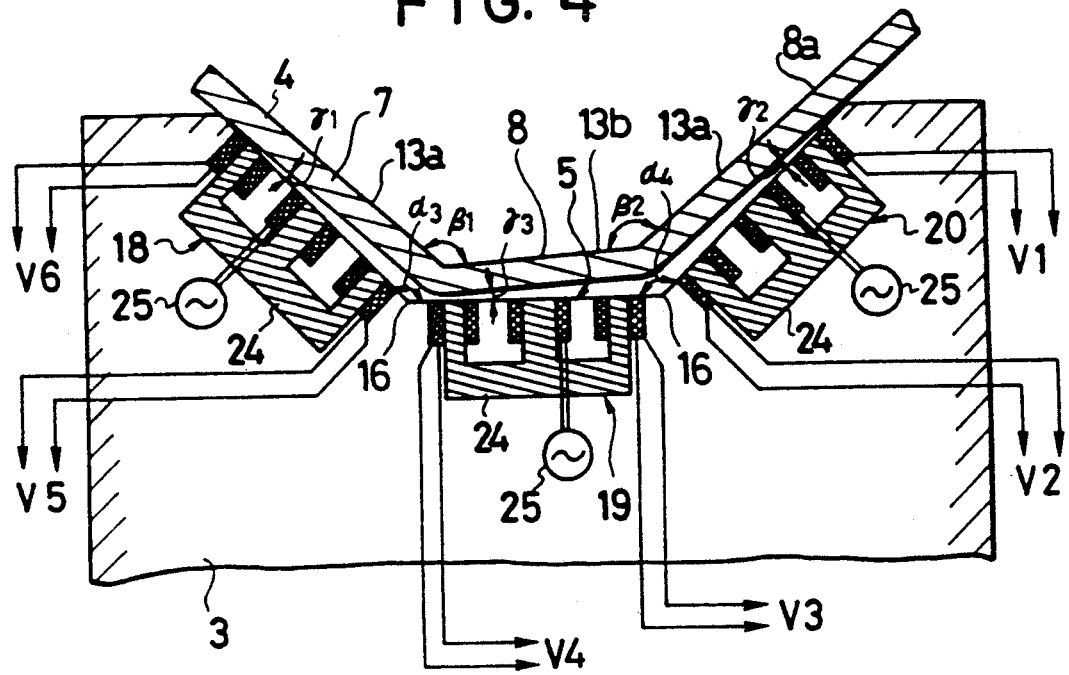
FIG. 4 shows a modified example of the angle detecting device shown in FIG. 1.

FIG. 4 shows a modified example of the angle detecting device incorporated in a die 3 which have a depressed seat 5 consisted of inclined two side walls 13a, 13a, and a bottom wall 13b. The seat 5 has two vertexes 16, 16 of which are respectively α3 and α4. In this example, the punch (not shown) folds the metal sheet 4 into three portions 7, 8 and 8a making two folds 6, 6 of respective folding angles of β1, β2. The device includes three differential transformers 18, 19 and 20 which are respectively mounted on the walls 13a, 13a, 13b of the depressed seat 5 formed on the die 3 of a folding machine. The folding angles β1 and β2 will be calculated by utilizing the angles γ1, γ2 and γ3 detected in a same manner described above, and if necessary, a supplementary folding will be carried out to deepen the achieved folds 6 of the metal sheet 4 in a similar way described above.

Figures 2, 3:
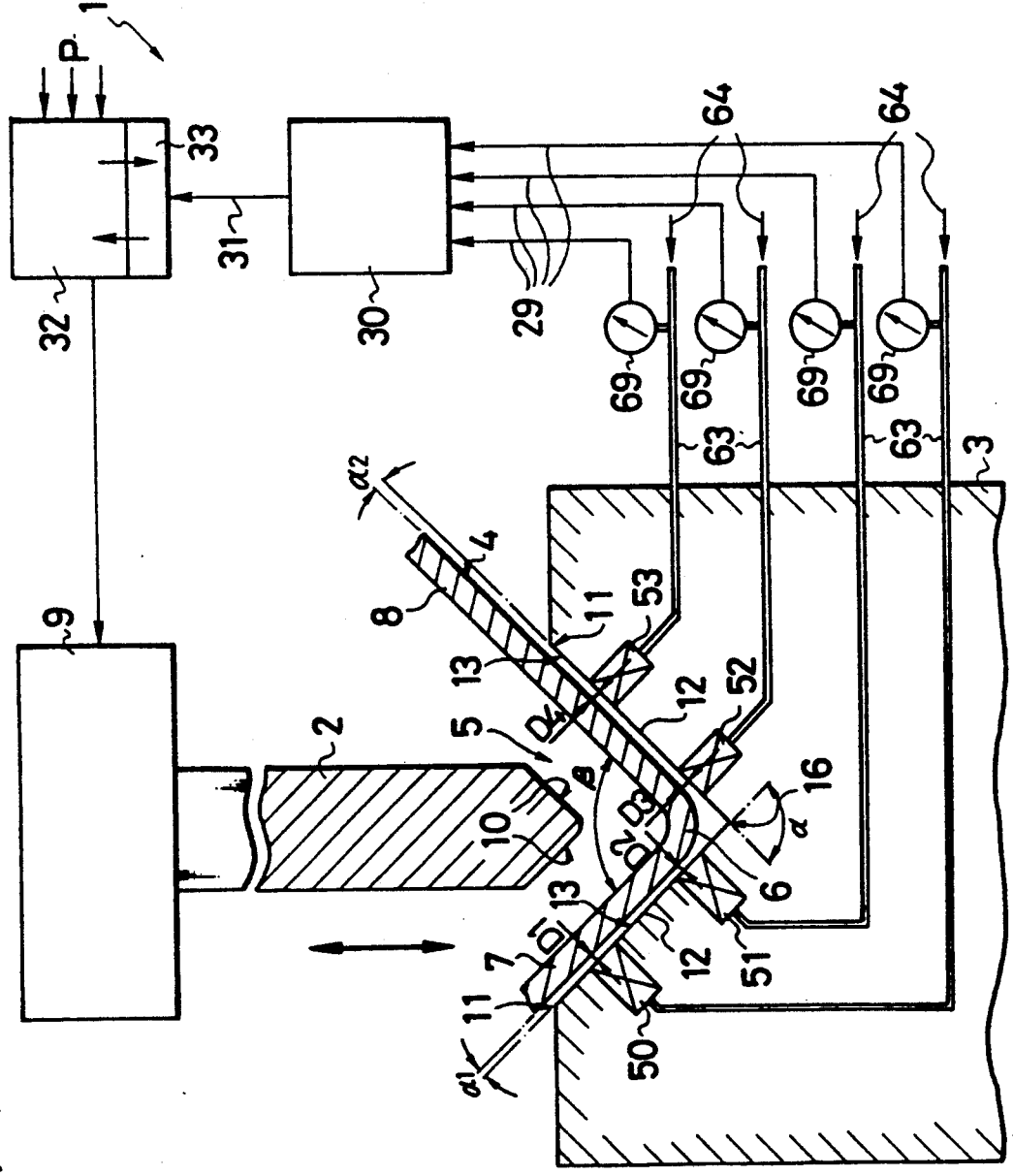
FIG. 2 is a schematic drawing of a folding machine provided with another angle detecting device of the present invention.
FIG. 3 shows a detail of a pneumatic gauge of the angle detecting device shown in FIG. 2.

In FIG. 2, there is shown a folding machine 1 provided with another angle detecting device of the present invention. According to the invention, within the seat 5 are disposed four pneumatic gauges 50, 51, 52 and 53, of known type. Each gauge is mounted on a respective lateral flank 12 of the seat 5 with its axis being substantially perpendicular to the internal wall surface 13 of the associated flank 12. The pneumatic gage emits towards the associated portion 7 or 8 which, during the folding stage, is disposed facing and adjacent the flank 12, a stream of gas (for example air) directed perpendicularly to the associated wall surface 13 of the respective flank 12. The gas stream, pressurized to a suitable value, is fed through respective tubes 63 which are formed at least in part within the die 3 and which are connected in a known way not illustrated for simplicity with a suitable circuit, for example to any type of pneumatic service circuit of the establishment in which the machine 1 operates.

In FIG. 3, by way of example and to facilitate understanding of the invention, the structure of one of the known pneumatic gauges 50, 51, 52, 53 is schematically illustrated on an enlarged scale. Gas 64 is supplied under pressure to a first chamber 65 which is connected in series to a second chamber 66 through a calibrated restriction 67. A jet of the gas 64 is then emitted from the chamber 66 through a nozzle 68 towards the surface of the portion 7 of the metal sheet 4. A differential manometer 69 constantly measures the difference in pressure between the chambers 65 and 66. In use the gauges 50, 51, 52, 53 are disposed with the nozzles 68 flush with the wall surface 13 of the associated flank 12 on which they are mounted. The presence of the associated portion 7, 8 of the metal sheet 4 causes an obstruction to the outlet nozzle 68. The closer is the nozzle to the metal sheet 4, the greater is the obstruction. In other words, the smaller is the individual distance D1, D2, D3 and D4 between each nozzle and the respective portion 7, 8 facing it, the greater is the obstruction. Therefore, the rate of flow of the jet of gas 64 through the nozzle is reduced and the gas stream accumulates in the chamber 66 raising the pressure within it, while the pressure in the chamber 65, thanks to the presence of the calibrated restriction 67, remains substantially constant. Therefore, it can detect the values of the distances D1, D2, D3 and D4 as pressure variations between the chambers 65, 66 of each gauge 50, 51, 52 and 53. The pressure variation is indicated by the associated differential manometer 69.

The differential manometers 69 emit an electrical signal proportional to the pressure difference detected by them and are connected to an algebraic summing device 30 of known type, through associated data lines 29. The summing device 30 receives these signals at its input and has an output line 31 which is connected in the illustrated example to an electronic central control unit 32 of know type, for example, a microprocessor for controlling the folding machine 1. The central control unit 32 controls the actuator means 9 to determine the relative motion of the punch 2 and the die 3. In particular, the line 31 is connected to a section 33 of the central control unit 32. This section 33, on the basis of the value of the signal sent through the line 31 from the summing device 30, calculates correction coefficients which are then provided to the central control unit 32 to which, for example through a suitable control software, there are also provided respective external working parameters P (for example the thickness and material of the metal sheet 4, and the value of the folding angle to be achieved).

In use, the metal sheet 4 is folded after it has been inserted between the punch 2 and the die 3. The depressed seat 5 of the die 3 has an angle $\alpha$ of fixed and known value at the vertex 16. The value of the angle is memorized in the central control unit 32. Then, the punch 2 and the die 3 are caused to approach each other following the actuation of the means 9 by the central control unit 32 according to the programme memorized in it, which processes the parameters P later. At the same time, the tubes 63 supply respective streams of compressed air 64 to the nozzles 68 of the pneumatic gauges 50, 51, 52 and 53. When the punch 2 comes into contact with the metal sheet 4 it deforms the sheet by pressing it against the seat 5 and forms the fold 6. During this folding stage, the central control unit 32 is programmed in such a way as to stop the penetration of the punch 2 into the seat 5 at a point such as to cause the forming of an angle $\beta$ between the portions 7 and 8 with the angle value in each case being not less than the desired value.

It is understood that starting with an unfolded metal sheet 4 having an angle $\beta$ equal to 180° (flat metal sheet), this angle is gradually reduced as the punch 2 penetrates the metal sheet 4 against the seat 5, progressively deepening the fold 6. It is also understood that in the fold 6 in part remains elastic deformation which reduces the depth of the fold 6, or increases the angle $\beta$ previously achieved when the metal sheet 4 is released.

After the penetrating, the central control unit 32 controls a relative separating of the punch 2 from the die 3 by an amount to permit the elastic return of the metal sheet 4, which cancels the elastic deformation remaining in the metal sheet 4. After the complete elastic return, the metal sheet 4 gets slight increase in the value of the angle $\beta$, and engages with flanks 12, in particular, with edges 11 of the flanks 12. According to the present invention, as soon as the central control unit 32 separates the die 3 from the punch 2 by an amount sufficient to obtain the said complete elastic return of the metal sheet 4, it proceeds to measure the increased angle $\beta$ formed between the portions 7, 8.

According to the present invention this measuring affected indirectly by measuring the distance between each portion 7 (or 8) of the metal sheet 4 and the associated flank 12 of the seat 5 at two predetermnined points sufficiently distant from each other on the wall surface 13 of the flank 12. In particular, it is preferable to select the first point to be near the vertex 16 and at the gauges 51, 52, and the second one to be near the lateral edge 11 and at the gauges 50, 53. The distance indicated respective by D1, D2, D3 and D4 are detected as respectively pressure differences between chambers 25 and 26 of each gauge 50, 51, 52, 53 indicated by the manometers 29, and sent to the unit 30 through the line 29 as electrical signals equally as voltage or current signals depending on the type of interface with which the manometers 69 are provided As soon as the metal sheet 4 becomes free from the punch 2, the summing device 30 reads the signals sent by the manometers 69, and according to its program, utilizes them to calculate the angle $\alpha 1$ and $\alpha 2$ formed between each portion 7, 8 of the metal sheet and the corresponding flank 12. This calculation is carried out by using simple geometrical rules. Finally, the summing device 30 operates to sum algebraically the value of the known and previously memorized angle $\alpha$, and the values of the angles $\alpha 1$ and $\alpha 2$ providing at its output, on the line 31, the exact value of the folding angles $\beta$ achieved. At this point, the central control unit 32 processes and compares the value of the angle $\beta$ with the desired value provided as one of the parameters P. If this comparison gives a negative result, the central control unit 32 processes a correction parameter in the section 33 and controls the execution of a supplementary folding operation to deepen the fold 6 by an amount depending on the calculated correction parameter to obtain the desired value of the angle $\beta$.

Figure 5:
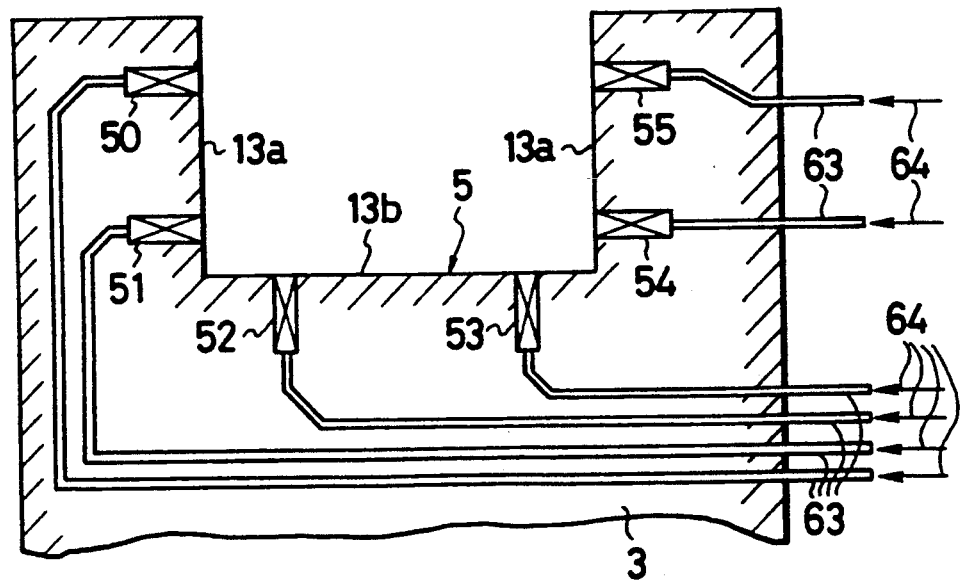
FIG. 5 shows a modified example of the angle detecting device shown in FIG. 2 and FIG. 3.

FIG. 5 shows a modified example of the angle detecting device using the pneumatic gauges. In this example the gauges are incorporated in a die 3 which has a depressed seat 5 consisted of two perpendicular side walls 13a, 13a, and a bottom wall 13b. The angle detecting device includes six pneumatic gauges 50, 51, 52, 53, 54, and 55. Each pair of them are respectively mounted on the wall 13a, or 13b of the depressed seat 5 of the die 3 of a folding machine. In this case, folding angles are calculated in the same manner described above, and if necessary, a supplementary folding will be carried out to deepen the folds of the metal sheet 4 achieved, in a similar way described above.

In FIG. 6 there is shown another angle detecting device which is the same one shown in FIG. 2, however, its pneumatic gauges 50, 51, 52, and 53 are incorporated in the punch 2 of a folding machine. In this example, each pair of pneumatic gauges are mounted on each inclined wall 10 of the punch 2 at two points distance from each other in L1 or L2, with their axes being substantially perpendicular to the wall 10. The gauges emit streams of gas to the portion 7, 8 of the sheet metal 4.

The distances D1, D2, D3 and D4 at the said points from each wall surface 10 to the portion 7 or 8 of the sheet metal 4 are measured in the same way described for the device shown in FIG. 2.

The angles α1, α2 formed by each wall 10 and the portion 7 or 8 of the sheet metal 4 are obtained by using the following equations:

$$\alpha 1 = \arctan (D1-D2)/L1$$

$$\alpha 2 = \arctan (D4-D3)/L2$$

Then, the folding angle β is obtained by summing these values and a constant value α of the angle formed by the two walls 10 and 10 of the punch 2. The value α is generally equal to the value of the angle of the vertex 16 of the seat 5.

Although in the example shown in FIG. 6 pneumatic gages are used as sensors for detecting the distances D1, D2, D3 and D4, using of differential transformers in the punch is possible as described for a device shown in FIG. 1.

It is understood that all the stages described a above can be performed by a single folding operation. In practice, the measuring of the angle α1 and α2 is carried out in real time while the metal sheet 4 is still in the seat 5 and between the punch 2 and the die 3. The stage of mutual separation of the punch and the die before the measuring stage is limited only to the minimum need to cause the residual elastic restoring of the metal sheet 4. If the elastic restoring is restrained, it would give false measurement.

A folding machine 1 equipped with the measuring device according to the present invention can fold a metal sheet with precision by a single folding operation, that is, without requiring a second positioning of the metal sheet, with consequent simplification of the production cycles, greater productivity and lower production costs.

It is also noted that using of pneumatic system for measuring the distances D makes it possible to detect the folding angles of a metal sheet of any nature, ferromagnetic or otherwise, and independently of the presence in the measuring zone of dirt or other contaminants which tend to be blown away by the air jets emitted by the gauges.

What is claimed is:

1. A method for detecting a folding angle formed between a pair of adjacent portions of a metal sheet during a folding operation by a folding machine provided with a punch and a die, said die having a pair of adjacent wall surfaces cooperating with a said punch when said metal sheet is inserted therebetween, the method comprising the following steps of:

measuring, after folding said metal sheet and after accommodating a residual elastic return resulting thereform, a distance of each sheet portion from each adjacent wall surface, said wall surfaces angularly spaced apart by a vertex angle therebetween, wherein each wall surface incorporates a pneumatic gauge to emit a gas jet against each respective sheet portion in the direction substantially perpendicular to the said sheet portion, and wherein each said pneumatic gauge characterizes each said distance;

calculating by using said characterizations, each angle formed between each said wall surface and the said sheet portion facing the said wall, each said angle taken about the vertex; and summing algebraically the value of the vertex angle and of the said calculated two angles.

2. A device for detecting a folding angle formed between a pair of adjacent portions of a metal sheet during a folding operating by a folding machine provided with a punch and a die, said die having a pair of adjacent wall surfaces cooperating with said punch, said punch having a wall surface, when said metal sheet is inserted therebetween, comprising:

sensor means for detecting a distance of each sheet portion from each adjacent wall surface, wherein the sensor means includes a plurality of pneumatic gauges incorporated in pairs in any two of said wall surfaces of said die or said punch, wherein each said pneumatic gauge emits a gas jet against each respective sheet portion in the direction substantially perpendicular to the said sheet portion; and an algebraic summing device for receiving gas pressure signals from each said sensor means.

* * * * *